Dec. 19, 1933.     F. H. WAGNER     1,940,196
DUST EXTRACTOR
Filed July 1, 1931     2 Sheets-Sheet 1
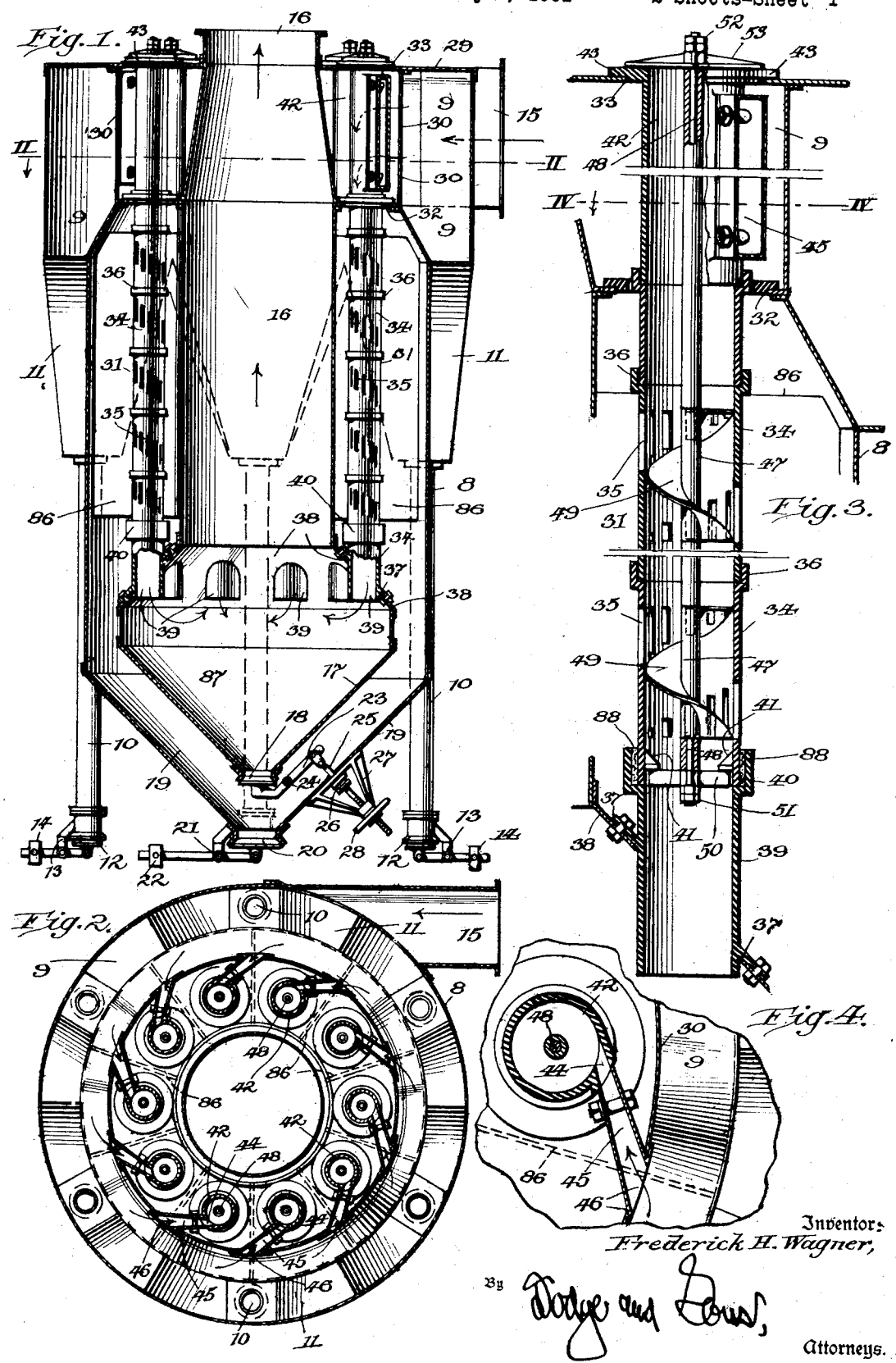

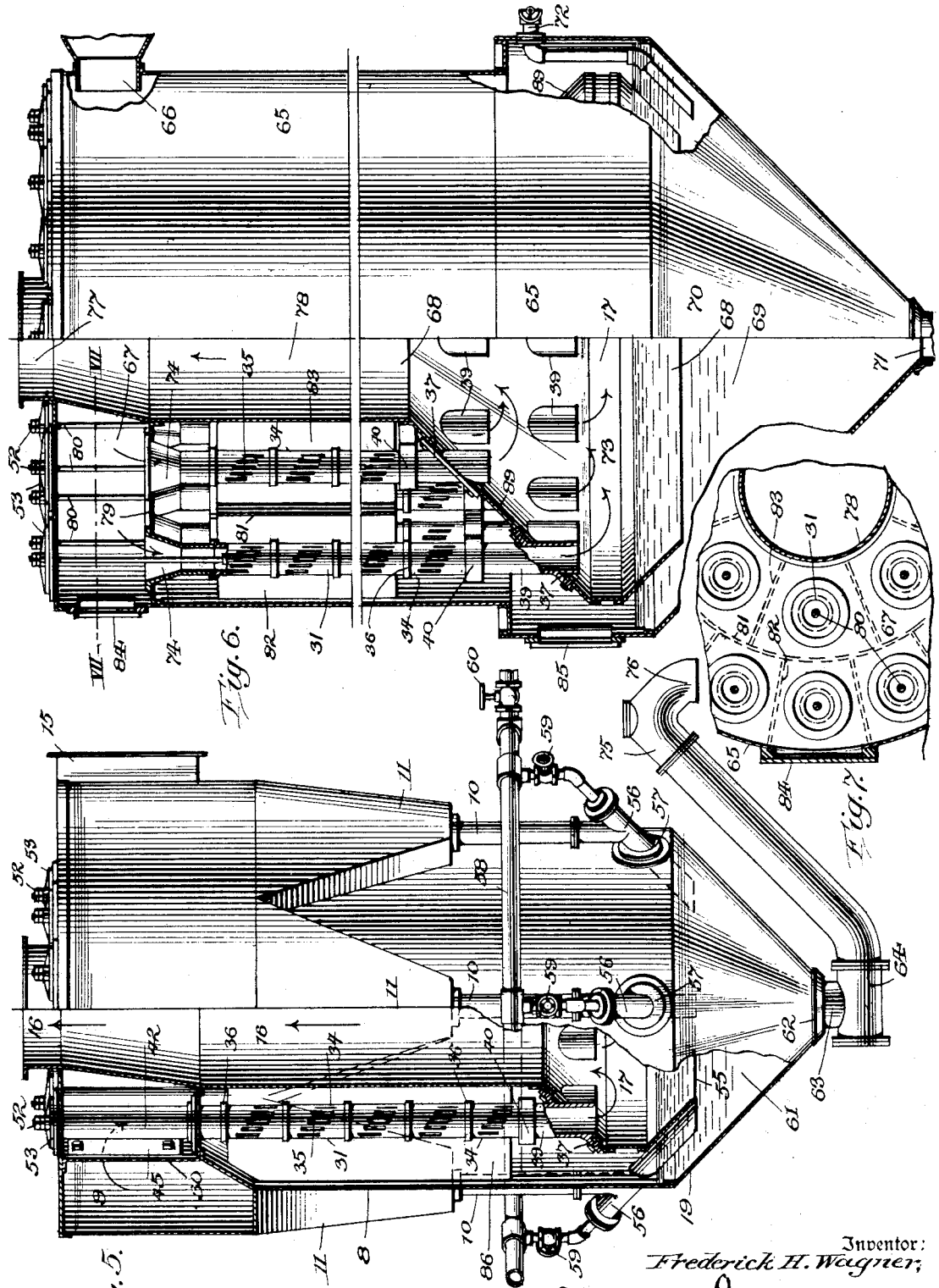

Patented Dec. 19, 1933

1,940,196

UNITED STATES PATENT OFFICE 1,940,196

DUST EXTRACTOR

Frederick H. Wagner, Baltimore, Md.

Application July 1, 1931. Serial No. 548,208

10 Claims. (Cl. 183—85)

This invention relates to methods of and apparatus for extracting solid particles from gases, and more particularly to extraction wherein centrifugal action is utilized for removing the solid particles.

The invention especially concerns an apparatus and method in which clean gas and dust-laden gas are prevented from intermingling, and means is provided for preventing dust and dust-laden gas from being drawn into the clean gas stream, when the gas velocities become lower than those for which the apparatus is initially designed.

In devices of the prior art, the so-called "cyclone" principle has been utilized for dust extraction, but several factors have prevented such devices from being as effective as practical considerations require that they should be. First, it is difficult to design a separator of the cyclone type so as to maintain the clean and dust-laden gases positively separated, and to prevent their intermingling at low velocities of the gas stream, because the incoming and outgoing gas streams are in directly contacting vortices. Second, the cross sectional diameter of the extractor tubes becomes so great, when they are designed for handling large volumes of gas, that particles near the centers of the tubes are not thrown far enough at low pressures to reach the exit openings provided for them in the tube walls.

Where dust-laden and clean gases are in contact, but in radially separated zones, as in certain well known forms of cyclone extractors, separation is dependent upon the maintenance of a predetermined velocity of the gas passing through the extractor. When this velocity falls below that for which the extractor is designed, the gases tend to intermingle, and this intermingling becomes more pronounced as the velocity of the gases decreases. However, in industrial processes, such for example as dust separation from blast furnaces, it is impossible to maintain any constant velocity because the gas volume, as well as its pressure, is changing constantly.

If the extracting apparatus is designed for the maximum gas capacity and velocity, even a reasonable pressure loss will cause changes in conditions as soon as the gas volume is reduced. This leads to what is sometimes termed an "inner leak", near the bottom, or in other words, it is possible under this low velocity-pressure condition for dust particles already thrown out of the gas to enter the clean gas stream, and travel along the axis from the dust outlet to the gas outlet. Consequently, the dust will pass out with the clean gas, because the clean gas is always in contact with the dust-laden gas, even though the latter is in an outer vortex and the former in an inner one.

The ideal type of cyclone is one in which the gas velocity in the annulus is such that the centrifugal force imparted to the dust particles is sufficient to project all of these particles across the annulus; the length of the cylinder is such as to produce a maximum number of whirls of the gas in passing from one end of the cylinder to the other; and finally one in which the cylinder is provided on the inside with helical baffles, so as to insure that the gas receives the maximum number of whirls.

Experience has shown that by dividing the gas into a number of smaller streams, or by the use of a plurality of small cyclone units, the rotational energy upon which successful operation depends becomes very high. Consequently the kinetic energy increase of the gas stream for a small radial displacement toward the axis of rotation also becomes high. This results in very smooth stream lines free from local eddies, hence the opportunity for acting on the very small solid particles is greatly increased.

Keeping the above requisites in mind, it has been found that by dividing a large stream of dust-laden gas into a number of small streams, and passing each of the small streams through a cyclone extractor of small cross section, while separating the clean gas from the dust and dust-laden gas by positive means which are operative at different gas velocities, the difficulties of the prior art may be almost wholly eliminated. Apparatus embodying these principles is capable of removing a very high percentage of dust from gas subjected to treatment, and the operation is not materially affected by changes in gas velocity, such as are encountered in practice.

Therefore, one object of this invention is to make use of a method of separating dust particles from gases, whereby a high percentage of extraction may be obtained, and the clean gases permanently separated from the dust and dust-laden gases.

A further object of the invention is to produce a dust extractor embodying a plurality of replaceable units, which can be removed readily for repair or inspection.

Another object is to produce an apparatus which is capable of satisfactory operation, either with a dry or a wet dust collecting chamber, and in which the dust may be removed from the extractor either dry or in the form of slurry.

A still further object of the invention is to produce a dust extractor in which the operating efficiency is maintained at a satisfactory value in spite of changes in gas velocity, dust density and gas density.

Further objects will appear from the following description when read in connection with the accompanying drawings, in which,—

Figure 1 is an axial sectional view of one form of dust extractor suitable for carrying out methods embodying this invention;

Fig. 2 is a horizontal section on line II—II of Fig. 1;

Fig. 3 is an axial sectional view of one of the extractor tubes removed from the apparatus, and also showing the manner of supporting the extractor tubes in the shell;

Fig. 4 is a fragmental enlarged section on line IV—IV of Fig. 3;

Fig. 5 is a side elevation of a modified form of extractor constructed for use in wet separation, parts being broken away to show the interior construction of the extractor.

Fig. 6 is a view similar to Fig. 5, but illustrating a modified form of extractor in which a radial gas inlet is employed; and Fig. 7 is a detailed fragmental view on line VII—VII of Fig. 6.

In extracting dust according to methods embodying this invention, it has been found preferable to introduce a volume of gas under pressure into a chamber and then divert this gas into a plurality of small streams. Each of these streams is passed through an extraction tube in which the gas is given a predetermined number of whirls, subjecting the dust particles to the action of centrifugal force and removing them from the gas stream. The extracted dust is allowed to settle by gravity in a collecting chamber, while the small streams of clean gas are allowed to intermingle in a chamber which communicates with a common outlet opening. This chamber is positively separated both from the dust collecting chamber and the chamber into which the dust-laden gases are forced.

In this manner each small stream of gas is certain to be given a predetermined number of whirls, and the parts are so designed that the dust particles will be thrown out of the extracting tubes into the dust-collecting chamber, in spite of changes in the velocity of the gas. The separation of the clean gas from the dust and dust-laden gas is positive, and is not in any way dependent upon the velocity of the incoming or outgoing gas. Hence, there is no possibility of the dust and dust-laden gas intermingling with the clean gas from which the dust particles have been removed.

One form of apparatus suitable for carrying out methods embodying this invention is shown in Fig. 1 of the drawings. Referring now to Fig. 1, the reference character 8 designates a hollow upright shell having an annular dust-receiving chamber 9 adjacent the top. In communication with the chamber 9 and at spaced intervals around the shell 8, are a plurality of dust legs 10, having flared upper portions 11 which communicate with chamber 9, and restricted tubular lower portions each provided with closures 12. Each closure 12 is carried by a lever pivoted to the legs 10 at 13 and biased to closed position by an adjustable counterweight 14. Dust may be removed from the legs 10 by opening the closures, or the counterweights 14 may be adjusted to such a position that accumulation of dust to a certain depth in the leg will cause the valve to open automatically and allow the dust to escape into suitable receptacles.

The top chamber 9 has connected to it, a tangential gas inlet 15, through which dust-laden gases are introduced into the extractor. After separation of the dust, the gas passes into a collecting chamber 87, and then to a gas outlet 16, here shown as a tubular casing centrally disposed within the shell 8 and having a constricted upper portion. The lower portion of outlet tube 16 defining the gas chamber 87, has an inclined portion 38 and a bottom flared casing 17 which is connected to the outer wall of the tube 16, and is constructed at the bottom for the reception of a pivoted closure 18. The shell 8 likewise has a flared bottom 19, closed by valve 20 pivoted at 21 and held in closed position by a counterweight 22. Inasmuch as closure 18 is inside of the bottom wall 19, means must be provided for actuating the closure 18 from outside of the shell.

As here shown, closure 18 is connected to a bent lever 23, pivoted at 24, and having connected to its end remote from the closure, a rod 25. This rod passes through the wall 19 and is sealed by a gland 26. The rod 25 is guided with relation to the gland 26 and the opening in the wall 19, by a frame 27 through the outer end of which it extends, and its outer end is threaded to receive an actuating wheel 28. It will be clear that by unscrewing the wheel 28, the free end of lever 23 may be forced inwardly so as to separate the closure 18 from its opening and allow any dust accumulated within the clean gas chamber to escape into the dust-collecting chamber inside of the wall 19.

The extractor is here shown as having a top 29 which serves as a common closure both for the chamber 9 and for the dust legs 10. This top is supported not only by the walls of the portions 11 of the dust legs 10, but also by a cylindrical apron 30 which is secured both to the top of shell 8 and to the top 29. The top of shell 8 as well as the closure 29, has a central opening to accommodate the gas outlet tube 16, and also spaced around the outlet 16 are other openings to receive extractor tubes 31. The top of shell 8 has openings 32, and the top 29 has openings 33, which are in vertical alignment to receive these tubes.

The annular space between shell 8 and outlet tube 16 is divided into separate cells by radial partitions 86. (See Fig. 3.) Each of these cells contains one of the tubes 31 and isolates it from the others, thereby preventing turbulence which would carry extracted dust from one tube to another.

Reference will now be had to Fig. 3 of the drawings, wherein the details of these extractor tubes are shown. The tubes are all of similar structure, hence a description of one of them will suffice for all. Each of these tubes 31 is preferably made up of a series of interchangeable sections 34 of hard white iron castings, capable of withstanding the hard wear to which these tubes are subjected by the impingement of dust particles. Each of these sections 34 has a series of helically arranged openings 35, through which dust particles are thrown outwardly by centrifugal force.

Each section has one end 36 enlarged to receive the small end of an adjoining section. The bottom section of each tube is imperforate and is provided with a flange 37, bolted to the inclined shell portion 38 which connects the outlet tube 16 with the wall 17. This flange is angularly related to the axis of the bottom section so as to engage closely the inclined portion of the shell. The bottom section preferably carries an integral shoulder 40, sufficiently enlarged to permit the formation of a sand seal 88 between it and the small end of the adjacent section 34. The interior of section 34 adjacent the bottom section 39 carries circumferentially spaced lugs 41 to which means may be secured for holding the various sections together, and also to receive the baffle member which is used with each of these tubes.

The sections 34 are so arranged that the flange 36 of one of them is in alignment with the top of shell 8 and seals tightly around the openings 32 in the top of this shell. Extending between the openings 32 and 33 is a section 42, provided with an exterior flange 43 at its top, and this section 42 is imperforate except for a portion of its side wall. This portion contains a vertical slot or opening 44 which communicates with the chamber 9 in the top of the extractor shell, through a tube 45 and an opening 46 in the apron 30.

In order to give the dust-laden gases passing through the extractor tubes a whirling motion capable of subjecting the dust particles to centrifugal action, each tube contains an extended spiral baffle member 47. This member comprises a rod 48 to which an extended spiral baffle 49 of sufficient diameter to fit accurately inside of the sections 34 is secured. The bottom end of rod 48 carries a spider 50 adapted to cooperate with the lugs 41 inside of sections 34, and to be held in engagement therewith by fastening means 51 at the bottom. Similar fastening means 52 at the top, cooperate with cover 53 which cover fits over and abuts against a flange 43 of each tube section 42. The members 47 may be made in sections to facilitate assembly and replacement.

It will be obvious from an inspection of Fig. 3, that when the fastening means 51 and 52 are tightened, the rod 48 will be subjected to longitudinal stress, thereby clamping this rod together with the parts carried by it, into fixed relation inside of the tube sections, and at the same time holding these sections tightly together in end-wise engagement. The baffles 49, in conjunction with the walls of tube sections 34, form a continuous helical passageway extending from opening 44 at the top, to the chamber 87 at the bottom of outlet tube 16, and the walls of these tubes are perforated in lines which are substantially parallel with the baffles 49 throughout their extent, so as to afford a ready means of escape for the dust particles which are thrown outwardly.

The operation of the extractor is as follows: When dust-laden gas is introduced into opening 15 under pressure, it passes around the chamber 9 at a high velocity. During this passage, large dust particles having comparatively large moments of inertia will strike the inner wall of the shell and fall by gravity into the portions 11 of dust legs 10, where they will collect. The gas volume as a whole, will separate into a plurality of small streams which will pass through openings 46 and tubes 45 into the various extractor tubes.

The gas stream in each tube will pass downwardly under pressure through the helical passageways and will be subjected to rapid whirling action. This action will cause the dust particles to be thrown outwardly by centrifugal force, and they will escape through the lateral openings 35 in the tube walls, and fall by gravity into the dust-collecting chamber at the bottom of shell 8 above closure 20. The streams of gas leaving the extractor tubes will all merge in the chamber 87 at the bottom of the outlet tube 16. Dust particles may from time to time pass through the tubes with the gas and enter chamber 87, where they may fall by gravity in this chamber and collect above the closure 18, while the gas volume as a whole will pass upwardly through the outlet 16, whence it may be delivered to any point desired.

By proper design of this apparatus, the extractor tubes may be made of such length and such diameter that, for a particular use, very efficient separation of the solid particles from the gases may be obtained, and any desired number of whirls imparted to the gas during the separation. By separating the main volume of dust-laden gas into a plurality of small streams, and keeping these streams positively separated both from the chamber containing the extracted dust, and from the outlet chamber through which the clean gas escapes, there is no possibility of the dust again entering the clean gas after the separation has once been made. This function is further enhanced by the isolation of the extractor tubes between partitions 86.

Although Figs. 1 to 4 illustrate a form of apparatus in which the dust is collected in dry form, it is obvious that it may be collected in a liquid, such as water, and removed in the form of slurry. If it is desired to employ a liquid for collecting the dust, the apparatus may be modified, as shown in Fig. 5.

Referring now to Fig. 5, the apparatus is the same as that already described, except that the bottom wall 17 of the inner shell is cut off at 55 so as to extend into and form a continuation of the dust-collecting chamber formed by wall 19. A liquid, such as water, may be admitted to this chamber through passages 56 which are supported in packing glands 57 in the outer wall of the shell 8. Passages 56 are here shown as forming integral continuations of the dust legs 10, so that all of the dust collected in the extractor will enter the liquid stream and be condensed therein.

Liquid is supplied to the pipes 56 through a common supply pipe 58 which passes entirely around the shell of the extractor, and to which the flow of water may be regulated by a suitable control valve 60. Each pipe 56 may also be controlled individually by a valve 59. By a suitable manipulation of these valves, the liquid 61 in the bottom chamber of the extractor may be brought to any desired level, but it should extend above the bottom end 55 of the inner shell so as to isolate this inner chamber from the outer dust-collecting chamber.

Attached to and forming a continuation of the shell 19 at the bottom, is a pipe 63 joined to the shell by suitable liquid tight means 62. Pipe 63 is connected to an angle trap 64 which prevents liquid from escaping from the lower chamber of the extractor so long as the level of the liquid does not rise above the outlet opening of pipe extension 75. By the provision of this trap arrangement, a constant flow of fluid may be supplied to the chamber without causing the level to exceed that of the extension 75, the overflow passing through the open end 76 of this extension.

The operation of the apparatus shown in Fig. 5 is the same as that shown in Fig. 1, with the exception that the dust which is removed from the gas is all collected in the liquid 61 and flows off therewith in the form of mud or slurry. For some uses, this form of apparatus is preferable because the circulation of dust through the container and around it is minimized. Under circumstances where an increase in the humidity of the gas from which dust is being extracted is not objectionable, the apparatus shown in Fig. 5 is very desirable and possesses all of the advantages which have been enumerated above for the apparatus shown in Fig. 1.

In Figs. 6 and 7 I have shown a further modified form of apparatus in which the dust is collected in a liquid, although it is obvious that the lower end 70 of the shell 65 and of the inner shell 78 may be constructed as indicated in Fig. 1, so that the dust is collected in dry form.

Referring now to Fig. 6, the reference character 65 designates an upright hollow shell having suspended within it an inner shell 78, terminating in a dust outlet 77 at the top, and a dust-collecting chamber 73 in the bottom of the inner shell enclosed by inclined apron 89. In this form, the top end of shell 65 is open and forms an annular chamber surrounding the outlet tube 77, and to which dust-laden gas under pressure is admitted through an opening 66. The opening 66 is disposed radially of the inner chamber 67 and differs in this respect from the prior forms of apparatus in which the gas inlets have been shown as tangential. The bottom end of the inner shell is open at 68 and dips into a bath of liquid 69 contained inside of the inclined wall 70. Connected to the bottom of this chamber is an outflow tube 71 to which any suitable form of trap may be connected, such for example as shown in Fig. 5. Liquid is supplied to the bottom chamber through suitable supply pipes 72, only one of which is here shown.

Vertically mounted inside of the shell 65 between the inner wall thereof, and the outer wall of inside shell 78 are two sets of extractor tubes of the form of those already described, with the exception that the top ends of these tubes are flared at 74 where they connect with the chamber 67. The top flared portions do not extend above the supporting plate 79 but merely rest on the edges of openings in this plate, and are held in position by supporting rods 80 carried by covers 53 to which they are bolted and secured by nuts 52. The shell 65 contains removable doors 84 and 85, through which access may be had to the interior of the extractor for repair and inspection.

From Fig. 7 of the drawings, it will be clear that two sets of radially spaced extractor tubes are provided in this modification, these being separated by an annular wall 81 supported by attachment to the inner and outer shells, or in any other convenient manner. The individual tubes of each set are likewise separated by radial partitions 82 and 83, the partitions 82 extending between the annular wall 81 and the inside of the outer shell, and the partitions 83 extending from the outside of the inner shell to the inner face of wall 81. By a construction such as this, the dust chamber is divided into a great many parallel sections so that whirling and eddying of the dust after its extraction from the gas, is reduced to a minimum. Turbulence is thereby prevented from carrying the dust from one tube to another after its removal from the dust-laden gas.

The operation of the apparatus shown in Figs. 6 and 7 is as follows: Dust-laden gas entering the chamber 67 through opening 66 is divided up into a great number of small streams which pass downwardly in parallel relation through the extractor tubes 31. In these tubes the streams are given a whirling motion so as to throw the dust particles out through the openings in the tube walls. The extracted dust falls on the outside of the inner shell 78 and passes downwardly into the liquid 69, where it is collected and carried away. The gas from which the dust has been removed passes out of the lower ends of the extractor tubes 31 into the chamber 68 from which it passes upwardly under pressure through the inner shell 78 and out of the outlet 77. The outflowing clean gas will comprise a great number of small streams, those from one set of extractor tubes entering the outlet at a higher level than those from the other set of tubes. In this way the tubes are isolated from one another and interference between the several streams is, as far as possible, avoided.

It will be obvious that the apparatus shown in Fig. 6 has many of the advantages already enumerated, and in addition is capable of being constructed to handle very large volumes of gas. It offers the same advantages of accessibility and removability of the extractor tubes as have been set forth in connection with the other constructions.

All forms of apparatus hereinbefore shown and described are capable of carrying out methods embodying this invention. Although it is not new to separate a large volume of dust-laden gas into a plurality of small streams, each of which is subjected to centrifugal action independently of the other, it is believed to be novel to perform this separation after subjecting the entire volume of gas to preliminary centrifugal action in a large chamber, and at the same time positively prevent the clean gas from intermingling with the dust and dust-laden gases upon variations in gas pressure and velocity. Accordingly, it is not desired that the invention be limited other than by such restrictions as are imposed upon the language of the claims by the disclosures of the prior art.

What is claimed is:

1. A dust extractor comprising a hollow upright shell having a tangential gas inlet communicating with a top chamber in the shell; a plurality of upright extractor tubes within the shell, each tube containing dust-escape openings in its wall, being open at both ends, and containing a helical baffle extending from top to bottom thereof; a vertical gas outlet disposed centrally of said tubes; and a dust-collecting chamber in the bottom of the shell below said tubes.

2. A dust extractor comprising a hollow shell having top and bottom chambers; a gas inlet communicating with the top chamber, and a vertical gas outlet tube communicating with the bottom chamber; a plurality of centrifugal dust-separating tubes disposed around said outlet tube and connecting the top and bottom chambers, said tubes having dust outlets in their outer walls; and a dust-collecting chamber below said bottom chamber.

3. A dust extractor comprising a hollow shell containing top and bottom chambers; a tangential gas inlet and a plurality of vertical dust-collecting cells isolated from said top chamber; a central gas outlet communicating with said bottom chamber; and a plurality of centrifugal dust-separating tubes disposed around said outlet tube, and connecting the top and bottom chambers of the shell.

4. A dust extractor comprising a hollow upright shell containing top and bottom chambers; a horizontal gas inlet connected to said top chamber; a vertical gas outlet disposed centrally of said shell and connected to said bottom chamber; and a plurality of tortuous centrifugal dust-separating tubes disposed around said outlet tube and connecting said top and bottom chambers, said tubes being removably disposed in said shell.

5. A dust extractor comprising a hollow upright shell containing top and bottom chambers; a horizontal gas inlet connected to said top chamber; a vertical gas outlet disposed centrally of said shell and connected to said bottom chamber; a plurality of centrifugal dust-separating tubes disposed around said outlet tube and connecting said top and bottom chambers, said tubes being removably disposed in said shell, and having dust-escape openings in their outer walls; and a dust-receiving chamber in said shell below said bottom chamber, and communicating with said dust-escape openings.

6. A dust extractor comprising a hollow shell having top and bottom chambers; a gas inlet for said top chamber; a gas outlet for the bottom chamber; a plurality of centrifugal dust-separating tubes disposed around said outlet and connecting said top and bottom chambers; means for isolating said tubes one from another; and means separated from the gas inlet and outlet for collecting the dust expelled from said tubes.

7. A dust extractor comprising two concentric hollow shells; an annular chamber in the top of the outside shell; a gas inlet for said annular chamber; a gas chamber in the bottom of said inner shell; a plurality of separate dust-collecting cells formed between said shells and isolated from said annular chamber; and dust-separating tubes disposed in said cells and connecting said annular chamber with the gas chamber.

8. A dust extractor comprising two concentric hollow shells; an annular chamber in the top of the outside shell; a gas inlet for said annular chamber; a gas chamber in the bottom of said inner shell; a plurality of separate dust-collecting cells formed between said shells and isolated from said annular chamber; dust-separating tubes disposed in said cells and connecting said annular chamber with the gas chamber; and a dust-collecting chamber in the bottom of said outer shell below said tubes in communication with said cells.

9. In a gas cleaning apparatus, the combination with a shell having a gas inlet, of a plurality of centrifugal dust-extracting apertured tubes for separating the gas introduced into the shell into a plurality of independent streams; means for dividing the shell into individual isolated cells, one for each of said extractor tubes; an outlet for cleaned gas, said outlet being in direct communication with said tubes; and means for keeping the extracted dust particles out of contact with the gas flowing through the apparatus.

10. A centrifugal dust extracting unit comprising a plurality of tubular sections each having spirally related openings in its wall; a central support in each section; a baffle in each section, said baffle being of helical form and forming with said wall and said support a helical passageway extending from one end to the other of said section; means on said supports for aligning said sections; and means for securing said sections in end-to-end relation.

FREDERICK H. WAGNER.